United States Patent [19]

Takeshita

[11] Patent Number: 5,477,290
[45] Date of Patent: Dec. 19, 1995

[54] CAMERA WITH MAGNETIC HEAD

[75] Inventor: Yukitake Takeshita, Saitama, Japan

[73] Assignee: Fuji Photo Film Co., Ltd., Kanagawa, Japan

[21] Appl. No.: 260,744

[22] Filed: Jun. 15, 1994

[30] Foreign Application Priority Data

Jun. 15, 1993 [JP] Japan ................................ 5-143713

[51] Int. Cl.⁶ ........................... G03B 17/24; G11B 15/60
[52] U.S. Cl. ........................................ 354/106; 360/130.3
[58] Field of Search ................................. 354/105, 106; 360/110, 130.3, 130.31, 130.32, 123, 125

[56] References Cited

U.S. PATENT DOCUMENTS

| | | |
|---|---|---|
| 3,749,851 | 7/1973 | Nakamichi . |
| 4,544,975 | 10/1985 | Oishi et al. . |
| 4,638,392 | 1/1987 | Akutsu . |
| 4,647,993 | 3/1987 | Schwarz . |
| 4,710,837 | 12/1987 | Matsumoto . |
| 4,834,306 | 5/1989 | Robertson et al. ............ 242/71.1 |
| 4,996,546 | 2/1991 | Pagano et al. . |
| 5,005,031 | 4/1991 | Kelbe . |
| 5,028,940 | 7/1991 | Pearson . |
| 5,097,278 | 3/1992 | Tamamura et al. . |
| 5,274,522 | 12/1993 | Taillie . |
| 5,276,578 | 1/1994 | Kato et al. . |
| 5,307,100 | 4/1994 | Kubo . |

FOREIGN PATENT DOCUMENTS

| | | | |
|---|---|---|---|
| 54-26721 | 2/1979 | Japan ......................... | G03B 17/24 |
| 411237 | 1/1992 | Japan ......................... | G03B 17/24 |
| 5281605 | 10/1993 | Japan ......................... | G03B 17/24 |
| WO9004201 | 4/1990 | WIPO ......................... | G03B 17/24 |
| WO9004202 | 4/1990 | WIPO ......................... | G03B 17/24 |

Primary Examiner—Michael L. Gellner
Assistant Examiner—Daniel Chapik
Attorney, Agent, or Firm—Sughrue, Mion, Zinn, Macpeak & Seas

[57] ABSTRACT

A camera for use with a photo film having a magnetic layer includes an exposure frame, behind which a film support plate supports the photo film. A magnetic head is disposed on the film support plate, and includes a shielding case, and a core provided with a coil wound thereon. The core is at least partially contained in the shielding and may have a portion which extends from the shielding case for contacting the recording layer. The lo core has curvature with reference to a longitudinal direction of the film and is convex with respect to the exposure frame. A pad confronts the magnetic head, is formed from inflexible material, and contacts the film at the magnetic head. Two projections are mounted on the exposure frame, and support the pad to be shiftable in a width direction of the film. The pad is pressed against the film, thereby to ensure contact of the magnetic head with the recording layer. The film is fed longitudinally between the exposure frame and the film support plate. While the film is fed, the magnetic head writes data to the recording layer and/or reads data therefrom.

16 Claims, 3 Drawing Sheets

FILM FEEDING →

CAMERA WITH MAGNETIC HEAD

BACKGROUND OF THE INVENTION

1. Field of the Invention

The present invention relates to a camera for use with photo film coated with a magnetic recording layer. More particularly, the present invention relates to an improvement in which a magnetic head in a camera reliably can contact a magnetic recording layer.

2. Description of the Related Art

A camera for use with photo film coated with a magnetic recording layer is disclosed, for example, in International Publications WO 90/04201 and 90/04202. The camera reads data from, and writes data to, the magnetic recording layer during movement of the film. A magnetic head, which is disposed on a film path defined in the camera, is used. Examples of magnetic data stored before photography are the type and sensitivity of the film. Magnetic data written to the recording layer during photography can be various photographing data which is related to conditions of photography.

The photo film includes a film base which is about 120 microns thick, i.e., two or three times as thick as ordinary magnetic tape such as audio tape. The photo film thus has a higher rigidity than audio tape. There is a proposed improvement in JP-A (Japanese Patent Laid-open Publication No.) 4-11237, in which a pad is disposed to confront a magnetic head in swingable fashion in a longitudinal direction of the film, and has curvature away from the magnetic head. The use of this pad enables the contact between the film and the magnetic head to be better, because the pad can swing to compensate an inclination in the position of the magnetic as mounted.

In writing data magnetically to the film, it is preferable to use portions on the film near either longitudinal edge outside of imaging frames, because the film must be rubbed by the magnetic head. However, sometimes the longitudinal edges have a roughly slitted portion, because the strips of the photo film are produced from a wide web material of the photo film, which are slitted longitudinally by a slitting apparatus in a factory. When the roughly slitted portion of the film in the camera is passed by the magnetic head, the film may be accidentally curved as soon as the rough portion contacts the inside of the camera body. The flatness of the film is thus lowered, and accuracy in contact of the magnetic head with the recording layer is reduced. Commonly assigned Japanese Patent Publication JP-A 5-281605, discloses a magnetic head with a core which has curvature projected with reference to a longitudinal direction of the film and toward the film. This reduces influences of the roughly slitted portion on the magnetic recording process.

The pad which is swingable along the direction of feeding of the film, however, fails to absorb an inclination of the magnetic head in a direction along the width of the film, namely transverse to the feeding of the film. If the magnetic head is inclined significantly in the width direction of the film, the area of the contact between the magnetic head and the film is reduced and the performance in writing/reading data of the magnetic head is deteriorated.

A conventional pad for the magnetic head is produced from fabric, such as felt, and is provided with flexibility. When in cooperation with the magnetic head, the pad is pushed and depressed by the magnetic head while the magnetic head is pressed against the photo film. The pad, which remains pressed by the magnetic head during extended use of the camera, becomes deformed irrecoverably. The force for pressing the magnetic head against the photo film is thus lowered over time. If the magnetic head has a core which protrudes from the head, the pad may have a much greater size with reference to the film width direction than a size of the core. The center of the pad is thus remarkably deformed in an irrecoverable fashion. The output of the magnetic head while reading the data is considerably deteriorated, because the magnetic writing/reading device is degraded primarily at the center of the magnetic head.

SUMMARY OF THE INVENTION

In view of the foregoing problems, an object of the present invention is to provide a camera having a magnetic head, in which the contact between the magnetic head with a magnetic recording layer on photo film is maintained in good condition through long use of the camera.

Another object of the present invention is to provide a camera with a magnetic head, in which a leader of photo film can be easily advanced through a path between the magnetic head and a pad.

In order to achieve the above and other objects and advantages of this invention, a camera includes an exposure frame in which an exposure aperture is formed. A film support plate is disposed behind the exposure frame for supporting a rear of the photo film. A magnetic head is mounted on the film support plate. The film is fed longitudinally between the exposure frame and the film support plate. The magnetic head writes data to the recording layer while the film is fed, and/or reads data from the recording layer while the film is fed. The magnetic head includes a shielding case and a core having a coil wound thereon. The core is partially contained in the shielding case, partially extends from the shielding case for contacting the recording layer, and has curvature projected with reference to a longitudinal direction of the film and toward the exposure frame. A flexible pad device is disposed to confront the magnetic head and contacts the film in opposition to the magnetic head.

A pad support device is mounted on the exposure frame, and supports the pad device to be moveable in a direction along a width of the film. The pad device is pressed against the film, thereby to ensure contact of the magnetic head with the recording layer. According to the present invention, the contact between the magnetic head with a magnetic recording layer on photo film can be maintained in good condition throughout a long life of the camera.

In a preferred embodiment, the pad device has curvature retracted with reference to the longitudinal direction of the film and away from the magnetic head. The retracted curvature is less sharp than the projected curvature of the core with reference to the longitudinal direction of the film and toward the pad device. The core further has curvature projected with reference to the width direction of the film and toward the pad device. A leader of the photo film can be easily advanced through a path between the magnetic head and the pad.

A leader-advancing photo film cassette, in which a leader of the photo film is entirely precontained in a cassette shell, and where the leader is advanced to the outside of the cassette shell in response to rotation of the spool, is known. This is favorable, as an amateur photographer, unaccustomed to loading a conventional camera with photo film manually, can load easily a new camera with the leader-advancing cassette. In a conventional camera with a magnetic head, however, the leader of the photo film, which is to be automatically advanced, is hindered from advancing externally through a path between the magnetic head and the pad, particularly when the pad consists of a roller.

The present invention, however, is advantageously applicable to a camera for use with a leader-advancing cassette, because rotation of a spool in the cassette can easily advance a leader of the photo film through a path between the magnetic head and the pad.

BRIEF DESCRIPTION OF THE DRAWINGS

The above objects and advantages of the present invention will become more apparent from the following detailed description when read in connection with the accompanying drawings, in which:

FIG. 1A is a layered structure illustrating photo film having a magnetic recording layer;

DETAILED DESCRIPTION OF THE PREFERRED EMBODIMENTS OF THE PRESENT INVENTION

Figure 1:
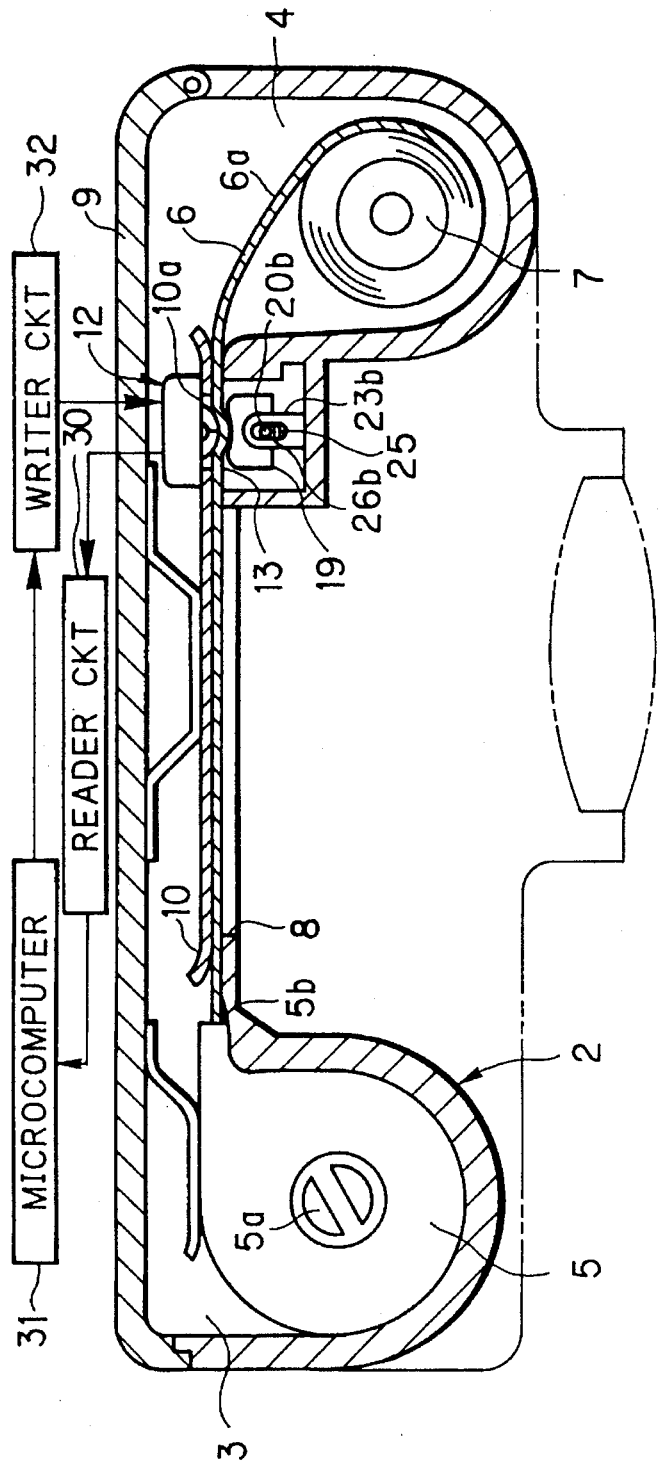
FIG. 1 is a horizontal sectional view illustrating a camera according to a preferred embodiment of the present invention.

In FIG. 1 illustrating a camera of the first preferred embodiment, a camera body 2 has a cassette containing chamber 3 and a photo film take-up chamber 4. A photo film cassette 5 is inserted into the cassette containing chamber 3. The take-up chamber 4 has a take-up spool 7 for taking up photo film 6. After exposure, the photo film 6 is wound on to the take-up spool 7 frame by frame. An exposure aperture 8 is formed between the cassette containing chamber 3 and the take-up chamber 4, and defines an area to be exposed on the photo film 6. A photo film support plate 10 is mounted resiliently on a back door 9, cooperates with the exposure aperture 8, and positions the photo film 6 with respect to a direction along the optical axis of a taking lens of the camera.

The cassette 5 is of a leader-advancing type in which the entirety of the photo film 6 is precontained in a cassette shell, a spool 5a is rotated by a drive shaft in the camera in the cassette containing chamber 3, and responsively a leader FL (See FIG. 3) of the photo film 6 is exited from the cassette shell through a photo film passage mouth 5b in a known manner. Details on the structure of this cassette can be the same as the cassette disclosed in U.S. Pat. No. 4,834,306.

Figure 2:
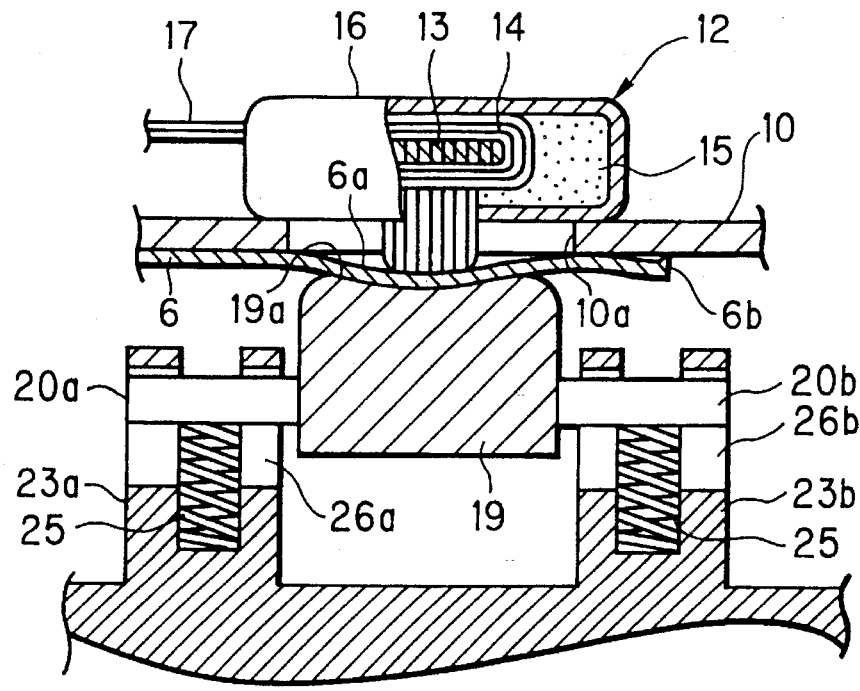
FIG. 2 is a cross sectional view illustrating a magnetic head in the camera of FIG. 1.

A magnetic head 12 is fixed through the photo film support plate 10, and viewed in FIG. 2 in a longitudinal direction of the photo film 6. A core 13 for the magnetic head 12 is formed of material such as permalloy, sendust, and amorphous alloy. A coil 14 is wound on the core 13, and adhered to the core 13 with a known core-attaching material 15 such as epoxy resin. The core 13 with the coil 14 is contained in a shielding case 16. The tip of the core 13 projects out of the shielding case 16. A signal cable 17 also extends from the shielding case 16.

The core 13 projected from the shielding case 16 has a tip face which is formed to be convex with respect to the longitudinal direction of the photo film 6 (See FIGS. 1 and 3) and to be convex with respect to a width direction of the photo film 6 as in FIG. 2. The core 13 extends through an opening 10a in the photo film support plate 10, projects from the opening 10a toward the front, and contacts a magnetic recording layer 6a formed on the photo film 6. Note that the core 13 of the preferred embodiment is projected 0.1 mm or more, preferably 0.2 mm or more, from the front face of the photo film support plate 10. This is favorable in keeping the photo film 6 flat despite the existence of a roughly slitted portion 6b along an edge of the photo film 6.

In FIG. 1A, reference sign EL designates an emulsion layer formed on a photo film support FB. The coating of the recording layer 6a is applied behind the photo film support FB of the photo film 6 and in arrangement of forming at least one narrow stripe, which is along either longitudinal edge, in order that the photo film 6 may be rubbed on the magnetic head 12 outside of areas for imaging frames. The core 13 contacts the recording layer 6a to write data to it or read data from it in digital form. Examples of the data read out of the photo film 6 are the kind of the photo film, the sensitivity of the photo film, and the number of frames photographable on the photo film. Examples of the data written to the photo film 6 are what is determined in photography, namely such photographing data as color temperature of a photographic object, brightness, contrast, an object distance, a flashing light amount, a shutter speed, and an aperture stop photographing data may also include trimming data if the camera is provided with a trimming designating construction as disclosed in JP-A (Japanese Patent Laid-open Publication No.) 54-26721. Notice that the recording layer 6a may be transparent instead of being opaque, and may cover the entirety of the rear of the photo film support FB instead of covering only a narrowed area as stripe.

A pad 19 confronts the magnetic head 12 and the photo film 6 is squeezed between them. The pad 19 is formed as one piece from a rigid polycarbonate. Even when the core 13 presses the pad 19, the pad 19 is never deformed. Thus the core 13 serve to reliably press the photo film 6 against the core 13 without any change in pressing force.

Figure 3:
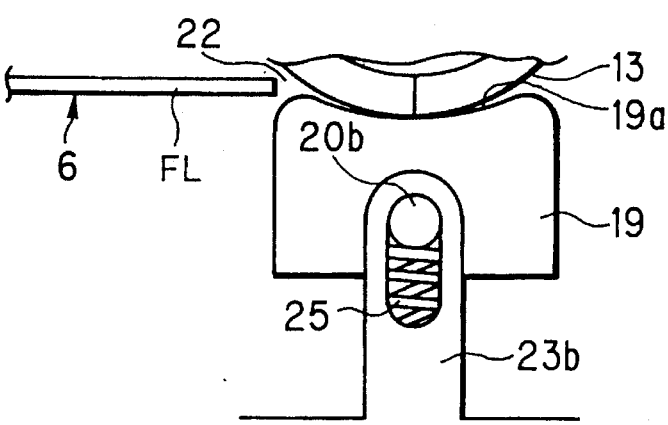
FIG. 3 is a front elevational view illustrating the magnetic head cooperating and the pad of FIG. 1.

As illustrated in FIG. 3, a contact face 19a of the pad 19 is concave with respect to the longitudinal direction of the photo film 6, and has a larger radius of curvature than the tip face of the core 13 with respect to the longitudinal direction of the photo film 6. When the pad 19 is in contact with the core 13, a gap 22 is formed between the core 13 and the pad 19 even when the photo film is not disposed between the pad 19 and the core 13. It follows that the leader FL of the photo film 6 is exited from the passage mouth 5b of the cassette 5, advances into the gap 22, contacts the pad 19 to depress it away from the core 13, and easily passes between the core 13 and the pad 19. The pad 19 is supported at projections 23a and 23b as described below.

As illustrated in FIG. 2, the projections 23a and 23b have respective coil springs 25. Support slots 26a and 26b are formed respectively in the projections 23a and 23b. Pad shafts 20a and 20b are disposed on respective sides of the pad 19, and have a round portion which is inserted in the support slots 26a and 26b. The support slots 26a and 26b and the pad shafts 20a and 20b cooperate to restrict movement of the pad 19. Normally the springs 25 bias the pad shafts 20a and 20b toward the photo film 6, and press the photo film 6 in the direction from the emulsion layer EL to the photo film support FB and against the magnetic head 12.

The pad shafts 20a and 20b allow the pad 19 to be swingable in the longitudinal direction of the photo film 6. Therefore, even if the magnetic head 12 is inclined or deviated, the pad 19 is swung minutely to ensure the contact of the recording layer 6a with the core 13. Also the pad shafts 20a and 20b can be slid along the support slots 26a and 26b. The pad 19 is thus shifted minutely in the width direction of the photo film 6, and further ensures the contact of the photo film 6 with the core 13. Notice that the contact face 19a of the pad 19 is concave also with respect to the width direction of the photo film 6 (see FIG. 2), and to an extent corresponding to the curvature of the core 13 with respect to the width direction of the photo film 6. Thus even if the pad 19 is shifted in the width direction of the photo film 6, the area of the contact between the photo film 6 and the core 13 is constant to maintain reliable contact of the magnetic head 12.

The contact face 19a of the pad 19 is formed to be smooth. The emulsion surface of the photo film 6 is not scratched, or subjected to excessive load in opposition to a mechanism in the camera for moving the photo film 6, when the film 6 rubs on the pad 19.

Operation of the above embodiment will now be described. When the photo film cassette 5 is loaded into the cassette containing chamber 3, the drive shaft inside rotates the spool 5a. Rotation of the spool 5a causes the leader FL of the photo film 6 to exit through the passage mouth 5b. Further rotation of the spool 5a inserts the leader FL into the gap 22 between the core 13 and the pad 19, and causes the leader FL to depress the pad 19, until the photo film 6 passes between the core 13 and the pad 19. The leader FL is then taken up on the take-up spool 7. The photo film 6 is wound into the take-up chamber 4 by rotation of the spool 7.

The depressed pad 19 still remains biased by the springs 25 via the pad shafts 20a and 20b, and pushes the emulsion layer EL, and presses the photo film 6 against the magnetic head 12, and thus the recording layer 6a against the core 13. The pad 19 is both horizontally swung and vertically shifted to sufficient extents to be properly fitted on the magnetic head 12 which be slightly deviated from a preferred position. It follows that the core 13 contacts the recording layer 6a in a reliable condition. The pad 19 is preferably made of polycarbonate and is thus highly resistant to deformation, and is favorable in maintaining good contact of the magnetic head 12. The contact face 19a of the pad 19 is concave with respect to the width direction of the photo film 6. Therefore the contact area of the core 13 with the recording layer 6a is kept constant even when the photo film 6 is seriously shifted in the width direction.

In the course of feeding of the photo film 6, a reader circuit 30 is operated. The magnetic head 12 reads data from the kind of the photo film 6 and/or its sensitivity out of the recording layer 6a. The data as read out is entered into a microcomputer 31, and stored in its memory in address positions which are predetermined for the data.

As the photo film 6 is further fed, the data of the number of the first frame on the photo film 6 and the sensitivity data are read out by the magnetic head 12. As soon as this data is entered into the microcomputer 31, the photo film 6 is stopped. The sensitivity data read for the second time is compared to that read for the first time, during the passage of the leader FL, to check the accuracy of the sensitivity as detected.

The microcomputer 31 processes photographing data and sends the same to a writer circuit 32. This data represents color temperature of the photographic object, brightness, contrast, the object distance, the flashing light amount, the shutter speed, the aperture stop, or the like. The magnetic head 12 receives signals from the writer circuit 32, and writes the data in the recording layer 6a. If the camera is a trimming designating camera as disclosed in JP-A (Japanese Patent Laid-open Publication No.) 54-26721, the microcomputer 31 also controls the magnetic head 12 to write the trimming data to the photo film 6. A printer/processor, when receiving the photo film 6 having the trimming data, reads out the data to produce trimmed prints in a known matter.

In the above embodiment, the coil springs 25 are used. Alternatively, the pad for the magnetic head 12 may be associated with plate springs or torsion springs. In the above embodiment, two springs 25 are used. Alternatively, a single spring may be mounted between the two projections 23a and 23b, and associated with a bottom of the pad 19. Further, it is possible to omit the support slots 26a and 26b from the projections, and omit the pad shafts 20a and 20b from the pad 19, while only the single spring connects the pad 19 to the exposure frame in movable fashion between the two projections.

Figure 4:
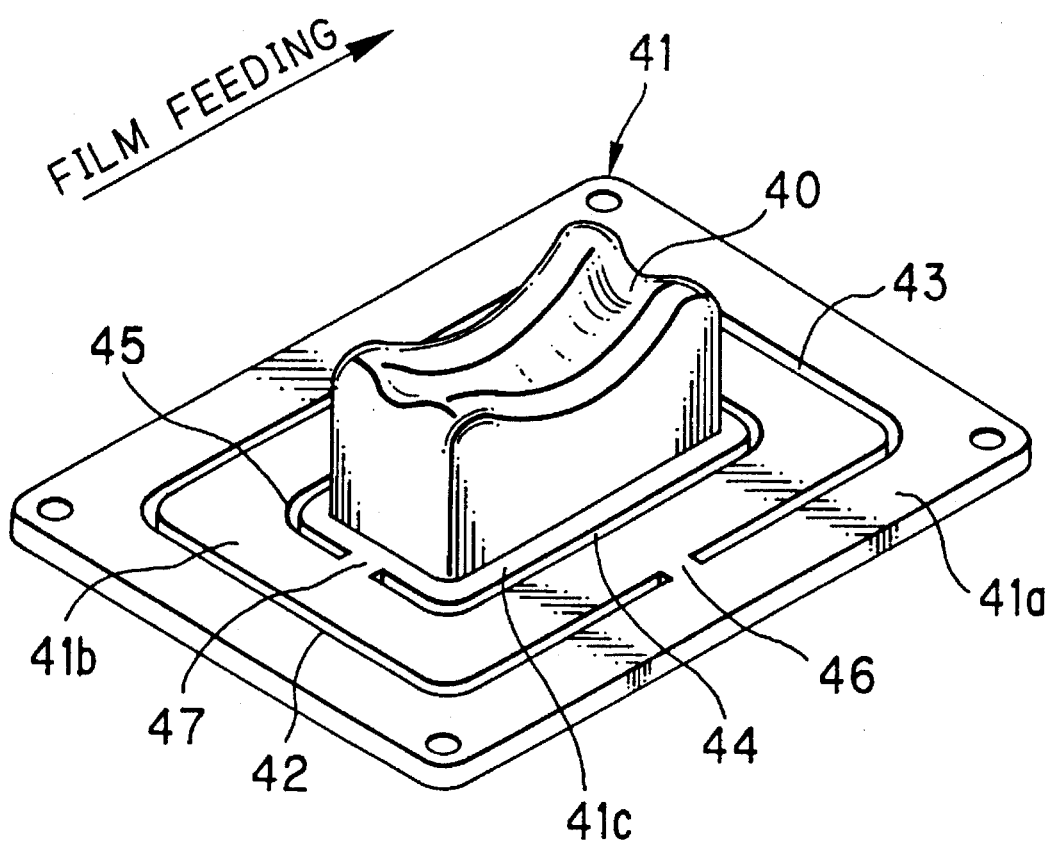
FIG. 4 is a perspective view illustrating a pad of a second preferred embodiment of the present invention.

Referring now to FIG. 4 illustrating another preferred embodiment, a pad 40 is mounted on a pad support plate 41 having a "gimbal" structure. The gimbal plate 41 has four grooves 42 to 45, and is constituted of a support frame section 41a, an intermediate section 41b, and a pad support section 41c where the pad 40 is disposed. There are a pair of connective portions 46 connecting the intermediate section 41b to the support frame section 41a, and a pair of connective portions 47 connecting the pad support section 41c to the intermediate section 41b.

The pad 40 is thus swingable in the longitudinal direction of the photo film 6, because the connective portions 46 can be flexibly twisted to incline the intermediate section 41b with respect to the support frame section 41a. Also the pad 40 is swingable in the width direction of the photo film 6, because the connective portions 47 can be flexibly twisted to incline the pad support section 41c with respect to the intermediate section 41b. The pad 40 is swung both horizontally and vertically to sufficient extents to be fitted on the magnetic head 12 which may be deviated. Good contact between the magnetic head 12 and the photo film 6 is thus maintained.

In the preferred embodiment, the gimbal plate 47 has three sections, the support frame section 41a, the intermediate section 41b, and the pad support section 41c. Alternatively, a gimbal plate may have only two sections or more than three. The support frame section 41a and the intermediate section 41b may be unified as a single section, without forming the through grooves 42 and 43 or the connecting portions 46.

In the above embodiment, the connective portions 47 are integrally formed with both the pad support section 41c and the intermediate section 41b. Alternatively, two horizontal rotatable shafts can be used. A pad support section may be formed separately from either an intermediate section or a support frame section. The rotatable shafts may rotatably connect the pad support section to either the intermediate section or the support frame section. In the above embodiment, the connective portions 46 are integrally formed with both the intermediate section 41b and the support frame section 41a. Alternatively, two vertical rotatable shafts can be used. A support frame section may be formed separately from either an intermediate section or a pad support section. The rotatable shafts may rotatably connect the support frame section to either the intermediate section or the pad support section.

Notice that the above pad 19, 40 is formed of polycarbonate, but may be formed of resin, or any non-resinous solid material, that meets the requirements of being resistant to deformation and scratching of the photo film 6. The above magnetic head 12 has the core 13 which protrudes from the shielding case 16, but may have a core flush with, or retracted from, an opening in a shielding case.

In the above embodiment, the concavity of the contact face 19a of the pad 19, 40, with reference to the longitudinal direction of the film 6 and away from the magnetic head 12, is less sharp than the convexity of the core 13, with reference to the longitudinal direction of the film 6 and toward the pad 19, 40. This is favorable especially in view of adaptation of the camera to the leader-advancing photo film cassette 5, because of the gap 22 between the pad 19, 40 and the magnetic head 12. Alternatively, it is possible to form the concavity of a contact face of a pad, with reference to the longitudinal direction of the film 6 and away from the magnetic head 12, to be substantially the same as the convexity of the core 13, with reference to the longitudinal direction of the film 6 and toward the pad. This may be preferable especially in view of the adaptation of the camera to a conventional photo film cassette, from which the leader is previously protruded from the cassette.

Although the present invention has been fully described by way of the preferred embodiments thereof with reference to the accompanying drawings, various changes and modifications will be apparent to those having skill in this field without departing from the scope of the present invention, as defined by the appended claims.

What is claimed is:

1. A camera for use with photo film having a magnetic recording layer, said camera including an exposure frame in which an exposure aperture is formed, said film being fed longitudinally between said exposure frame and said film support plate, data being written to said recording layer while said film is fed, and/or said data being read from said recording layer while said film is fed; said camera comprising:

a magnetic head including a shielding case, and a core having a coil wound thereon, said core being at least partially contained in said shielding case, a contact surface of said magnetic head contacting said recording layer, said contact surface having curvature with respect to a longitudinal direction of said film and being concave with respect to said exposure frame;

a pad device, disposed in opposition to said magnetic head, and formed from inflexible material, for contacting said film proximate said magnetic head; and a pad support device, mounted on the camera, for supporting said pad device to be shiftable in a direction along a width of said film, and to press said pad device against said film, thereby to ensure contact of said magnetic head with said recording layer.

2. A camera as defined in claim 1, further comprising:

a film support plate disposed behind said support frame for supporting a rear surface of said photo film, said pad support device being disposed on said film support plate.

3. A camera as defined in claim 2, wherein a portion of said core, protrudes from said shielding case, an opening being formed in said film support plate for insertion of said core therethrough, said contact surface being defined on said portion of said core.

4. A camera as defined in claim 3, wherein said pad device is formed of resin.

5. A camera as defined in claim 4, wherein said portion of said core protrudes at least 0.1 mm from said opening in said film support plate toward said pad device.

6. A camera as defined in claim 4, wherein said pad device has curvature with respect to said longitudinal direction of said film and is convex with respect to said magnetic head, a radius of curvature of said pad device being larger than a radius of curvature said of said core with respect to said longitudinal direction of said film.

7. A camera as defined in claim 6, wherein said core has curvature with respect to said width direction of said film and concave with respect to said pad device.

8. A camera as defined in claim 7, wherein said pad device further has curvature with respect to said width direction of said film and is convex with respect to said magnetic head.

9. A camera as defined in claim 8, wherein said pad device is made of polycarbonate.

10. A camera as defined in claim 3, wherein said pad support device includes:

a pair of projections disposed on said exposure frame and arranged in said width direction of said film, said pad device being disposed between said projections, said projections being spaced apart from one another at an interval greater than a size of said pad device in said width direction of said film; and a biasing device mounted on said exposure frame, and coupled to said pad device, for biasing said pad device toward said magnetic head.

11. A camera as defined in claim 10, further comprising:

a pair of support slots respectively formed in said projections to extend toward said exposure frame; and a pair of pad shafts disposed on said pad device, and respectively supported in said support slots in rotatable and slidable fashion for allowing said pad device to be swingable in said longitudinal direction of said film and to be retractable away from said magnetic head.

12. A camera as defined in claim 11, wherein said biasing device comprises a pair of biasing elements, which are disposed respectively in said support slots, and respectively bias said pad shafts toward said magnetic head.

13. A camera as defined in claim 3, wherein said pad support device includes:

a support frame member mounted on said exposure frame, provided with an inside opening so shaped that said support frame member is located around said pad device; and a pair of axial members, disposed on said pad device, arranged in said longitudinal direction of said film, and rotatably supported in said opening in said support frame member, for allowing said pad device to be swingable with reference to said width direction of said film and relative to said exposure frame.

14. A camera as defined in claim 13, further comprising:

a pad support plate on which said pad device is mounted; and a first pair of narrowly shaped torsional connective portions, formed integrally with said pad support plate and arranged in said longitudinal direction of said film to constitute said axial members, said connecting portions being formed integrally with said support frame member to allow said pad support plate to swing relative to said support frame member.

15. A camera as defined in claim 14, further comprising a pair of through grooves formed in said pad support plate and arranged around said pad device, said through grooves defining a second pair of narrowly shaped torsional connecting portions formed therebetween and arranged in said width direction of said film, for allowing said pad device to be swingable with reference to said longitudinal direction of said film.

16. A camera for use with photo film coated with a magnetic recording layer, said camera comprising:

a magnetic head constituted of a shielding case, and a core having a coil wound thereon, said core being partially contained in said shielding case and having a portion which extends from said shielding case for contacting said recording layer, said film being fed longitudinally, said core having curvature with respect to a longitudinal direction of said film and being convex with respect to said film, and said magnetic head writing data to said recording layer, and/or said magnetic head reading data out of said recording layer;

a pad device, disposed in opposition to said magnetic head, for contacting said film proximate said magnetic head, said pad device being pressed against said film, to ensure contact of said magnetic head with said recording layer;

wherein said pad device is formed from inflexible material, and including means for supporting said pad for movement in a direction along a width of said film.

* * * * *